(12) United States Patent
Murase et al.

(10) Patent No.: US 7,866,930 B2
(45) Date of Patent: Jan. 11, 2011

(54) BOLT

(75) Inventors: Yoshihiro Murase, Motosu (JP);
Tetsuya Oosawa, Komaki (JP); Mitsuru Kozawa, Kounan (JP); Sadayoshi Hasegawa, Inazawa (JP)

(73) Assignee: Aoyama Seisakusho Co., Ltd., Nagoya-Shi (JP)

( * ) Notice: Subject to any disclaimer, the term of this patent is extended or adjusted under 35 U.S.C. 154(b) by 0 days.

(21) Appl. No.: 11/914,660

(22) PCT Filed: Jun. 13, 2005

(86) PCT No.: PCT/JP2005/010777

§ 371 (c)(1),
(2), (4) Date: Feb. 13, 2008

(87) PCT Pub. No.: WO2006/134626

PCT Pub. Date: Dec. 21, 2006

(65) Prior Publication Data

US 2009/0060676 A1    Mar. 5, 2009

(51) Int. Cl.
*F16B 35/04* (2006.01)
(52) U.S. Cl. .................................. 411/386; 411/412
(58) Field of Classification Search .............. 411/386, 411/411–413, 423
See application file for complete search history.

(56) References Cited

U.S. PATENT DOCUMENTS

| 4,018,132 | A | 4/1977 | Abe |
| 6,125,526 | A * | 10/2000 | Wierzchon .......... 29/525.02 |
| 6,666,638 | B2 * | 12/2003 | Craven ................ 411/413 |
| 6,796,761 | B2 * | 9/2004 | Mizuno et al. ......... 411/386 |
| 6,918,727 | B2 * | 7/2005 | Huang ................. 411/389 |
| 7,213,999 | B2 * | 5/2007 | Haas .................. 403/337 |
| 2007/0217887 | A1 * | 9/2007 | Lin .................... 411/413 |

FOREIGN PATENT DOCUMENTS

| GB | 321614 A1 | 11/1929 |
| GB | 1 444 885 A1 | 8/1976 |
| JP | 01-182613 A1 | 7/1989 |
| JP | 10-073118 A1 | 3/1998 |
| JP | 11-182521 A1 | 7/1999 |
| JP | 2000-274417 A1 | 10/2000 |
| JP | 2002-195230 A1 | 7/2002 |
| JP | 2003-172330 A1 | 6/2003 |
| WO | 99/31395 A1 | 6/1999 |

* cited by examiner

*Primary Examiner*—Gary Estremsky
(74) *Attorney, Agent, or Firm*—Burr & Brown

(57) ABSTRACT

In a bolt of the present invention, a guide portion having a small diameter is formed at the distal end of a shaft portion and ridge having an inverted direction screw configuration relative to the ridge formed on a constant diameter portion is formed. When the bolt is inserted obliquely into a nut and the ridge gets into engagement with a female screw portion of the nut, an effect of floating the bolt is generated, and the bolt cannot be driven into the nut unless it is set in an appropriate tightening posture. Consequently, biting and seizing of the bolt to the nut can be prevented securely. If the ridge is formed into a double threaded screw having an inverted direction screw configuration, the effect can be further intensified.

2 Claims, 6 Drawing Sheets

BOLT

TECHNICAL FIELD

The present invention relates to a bolt, and more particularly to a bolt formed to prevent itself from biting and seizing to a female screw member.

BACKGROUND ART

Conventionally, there has been proposed a so-called biting preventing bolt which when inserted obliquely into a female screw member of a nut or the like, it allows the bolt to be threaded smoothly into the female screw member without any biting by guiding its own posture with a guide portion formed on its shaft portion appropriately. Although ordinary bolts have a shaft portion having a substantially constant diameter, such a biting preventive bolt is provided with a small diameter or a tapered guide portion at the front end of the shaft portion so that when the guide portion comes into contact with the peripheral face of a screw hole in the female screw member, the posture of the bolt is guided properly. For example, the Patent Document 1 has disclosed a bolt in which a constant diameter column portion having a small diameter is formed at the front end of the shaft portion and complete ridge is formed on this constant diameter column portion, and further the outside diameter of the constant diameter column portion is almost equal to a minimum value of the inside diameter of the female screw. In cases of a bolt having such a structure, when the bolt is inserted obliquely into the female screw, the complete ridge of the constant diameter column portion can catch the ridge of the female screw, and if it is continued to be tightened as is, the screw portions can properly engage with each other along a lead. Patent document 1: Japanese Patent Application Laid-Open No.2000-18226

DISCLOSURE OF THE INVENTION

Problems to be Solved by the Invention

Under the above-described conventional art, if the inclination angle of the bolt with respect to the female screw member is relatively small, the posture of the bolt is guided appropriately by the shape of the guide of the shaft portion and the bolt can be threaded smoothly into the female screw portion so that the bolt is drawn into the female screw portion of the female screw member. However, if the bolt is inclined largely with respect to the female screw member, the bolt can be drawn into the female screw portion of the female screw member with the posture of the bolt not guided appropriately, that is, the bolt remains tilted. Consequently, there is generated such a problem that the bolt may be drawn into the female screw member with a deviation in pitch, whereby possibly generating a biting and seizing.

The present invention has been achieved to solve the above-described problem and an object of the present invention is to provide a bolt which cannot be driven into unless it gains an appropriate tightening posture with respect to the female screw member in order to securely prevent itself from biting or seizing to the female screw member.

Means for Solving the Problem

To achieve the above-described object, the bolt is preferably a bolt having a head portion and a shaft portion on which a ridge is formed, the bolt being adapted to be tightened into a female screw member such as a nut, wherein the shaft portion is comprised of a constant diameter portion having a constant diameter formed on the proximal end side and a guide portion formed on a front end side thereof and having a smaller diameter than the constant diameter portion, the ridge formed on the guide portion being formed in an inverted direction screw configuration with respect to the ridge formed on the constant diameter portion.

The bolt is preferably characterized in that the ridge formed on the guide portion are formed into a double threaded screw having an inverted direction screw configuration in addition to the structure of the bolt described above. The bolt is preferably characterized in that a non-threaded portion having no ridge is formed in a predetermined range between the constant diameter portion and the guide portion of the shaft portion.

EFFECTS OF THE INVENTION

In the bolt according to the present invention, the guide portion having a smaller diameter than the constant diameter portion of the proximal end side is formed on the front end side of the shaft, and the ridge formed on this guide portion is formed in an inverted direction screw configuration with respect to the ridge formed on the constant diameter portion. Consequently, when the bolt is inserted obliquely into the female screw portion, the guide portion of the bolt interferes with the female screw portion of the female screw member, or the guide portion interferes and the ridge formed on the guide portion starts into engagement with the female screw of the female screw member. If the guide portion just interferes with the female screw portion, the bolt is driven into the female screw member after that. Next, if the ridge of the guide portion is in engagement with the female screw, while the bolt is rotated in a direction of being driven into the female screw member, the bolt escapes from the female screw member due to engagement between the ridge having an inverted direction screw configuration of the guide portion and the female screw portion. In other words, because the bolt is disabled from being driven into the female screw member when it is tilted, the bolt is never driven into the female screw member in an inappropriate condition. Therefore, biting and seizing of the bolt can be prevented securely.

In the bolt of a second embodiment in which the ridge formed on the guide portion is formed into double threaded screw having an inverted direction screw configuration, the amount of travel of the ridge formed on the constant diameter portion is a single pitch per revolution of the bolt 1, while the amount of travel of the ridge formed on the guide portion is two pitches. Consequently, the easiness of escaping are intensified as compared with a case where the ridge formed on the guide portion is of a single threaded screw. In the bolt described in the third embodiment, the non-threaded portion having no threads is formed in a predetermined range between the constant diameter portion of the shaft portion and the guide portion, so that, when the bolt is inserted into the female screw portion of the female screw member in a tilted condition, the non-threaded portion and the female screw portion never engage each other even if the non-threaded portion interferes with the inner peripheral face of the female screw portion. Consequently, the bolt never bites into the female screw member and the bolt can be securely prevented from biting and seizing up.

DESCRIPTION OF REFERENCE NUMERALS

Figure 1:
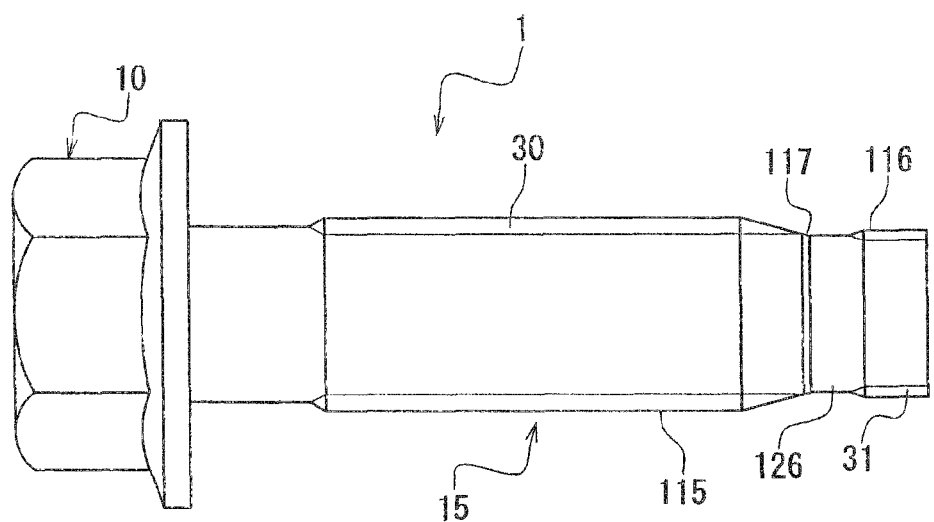
FIG. 1 is a side view of a bolt of according to a first embodiment.

1: bolt
10: head portion
15: shaft portion
30: ridge
31: ridge
32: ridge of double threaded screw
115: constant diameter portion
116: guide portion
126: no-threaded portion

BEST MODE FOR CARRYING OUT THE INVENTION

Figure 2:
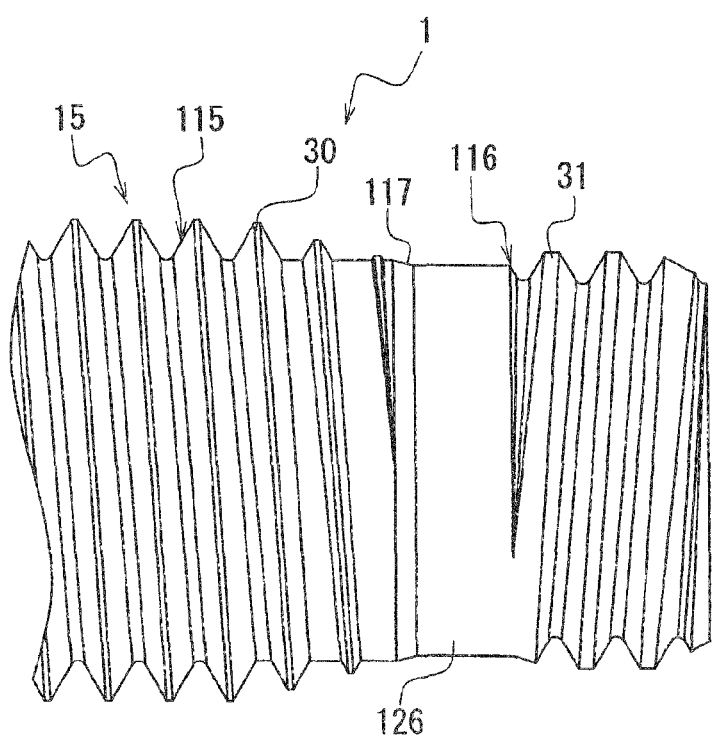
FIG. 2 is an enlarged view of a part showing a front end portion of the shaft portion of the bolt.

Hereinafter, the first embodiment of the bolt of the present invention will be described with reference to the drawings. First, the configuration of a bolt is described by referring to FIG. 1 and FIG. 2. FIG. 1 represents a simplified thread formed on the bolt 1. As shown in FIG. 1 and FIG. 2, the bolt 1 is constituted of a substantially hexagonal column-like head portion 10 extending along a common shaft center and a substantially cylindrical shaft portion 15. A proximal end side of the shaft portion 15 is formed into a cylindrical constant diameter portion 115 having a constant diameter and a ridge 30 is formed on the external peripheral face of the constant diameter portion 115 with predetermined pitches. This ridge 30 is formed into a right-hand screw configuration which allows the bolt 1 to be driven into the female screw member when it is turned in the rightward direction (turned clockwise). The distal end side of the shaft portion 15 is formed into a cylindrical shape having a smaller diameter than the constant diameter portion 115 and it serves as a guide portion 116 for guiding correctly the posture of the bolt 1 to a right posture when the bolt 1 is threaded into a nut described later.

In a specified range of the front end of the constant diameter portion 115, more specifically, a range of a length that is around three times as long as a pitch of the ridge 30, the height of the ridge 30 decreases gradually from the proximal end of the shaft portion 15 toward the front end, so that the external shape of the screw thread formed by connecting the crests of ridge 30 is tapered at a taper angle of about 15° with the diameter reduced gradually. It should be noted that the diameter of the root of the constant diameter portion 115 including that portion is of a constant size. Further, a substantially truncated cone shaped tapered portion 117 is formed in a very short range between a guide portion 116 and the constant diameter portion 115. The tapered portion 117 is comprised of a circular bottom portion having a diameter equal to the root diameter of the constant diameter portion 115 and a circular crest portion having a diameter equal to the diameter of the non-threaded portion of the guide portion 116 described later and its diameter is decreased at a taper angle of about 15° from the bottom portion toward the rest while no ridge is formed on the external peripheral face.

The guide portion 116 extends from the front end (crest) of this tapered portion 117 toward the front end of the shaft portion 15 and part of the proximal end side is formed into the cylindrical non-threaded portion 126 on which no ridge is formed. More specifically, on the proximal end side of the guide portion 116 the non-threaded portion 126 is formed over a length substantially 1.6 times as long as the pitch of the ridge 30 formed in the constant diameter portion 115 and a ridge 31 is formed in an area of a further front end side. The ridge 31 is formed with a ridge angle of about 60° and has the same pitch as the ridge 30. The root diameter of the ridge 31 is smaller than the diameter of the non-threaded portion 126 and its outside diameter is larger than the diameter of the non-threaded portion 126. It should be noted that this outside diameter is formed smaller than the inside diameter of the female screw portion of the female screw member with which the bolt 1 engages. The ridge 31 formed on the guide portion 116 is formed into an inverted direction screw configuration to the ridge 30 formed on the constant diameter portion 115. That is, while the ridge 30 on the constant diameter portion 115 is in a right-hand screw configuration which allows itself to be driven in with a right-hand rotation, the ridge 31 formed on the guide portion 116 is formed into a left-hand screw configuration which allows itself to be released from the female screw member when the bolt 1 is turned in the rightward direction.

Figure 3:
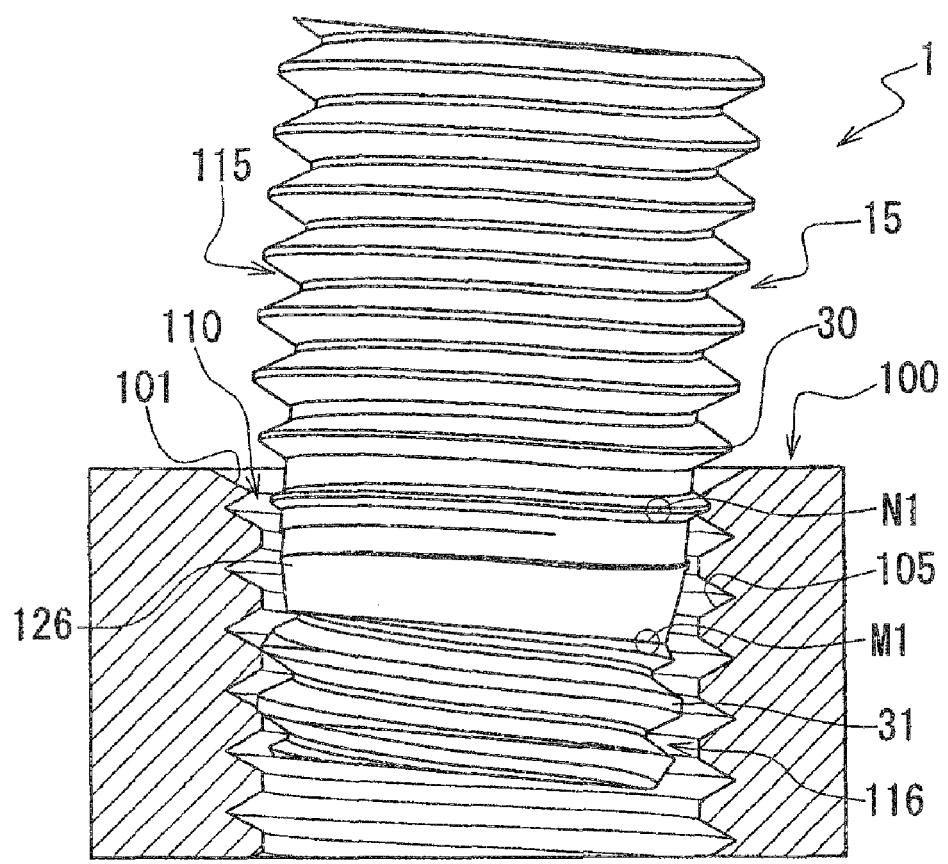
FIG. 3 is a sectional view of a part showing a condition in which the bolt is inserted into a screw hole of a nut in a tilted condition.

Next, screwing together of the bolt 1 and a nut 100 as a female screw member will be described with reference to FIG. 3 and FIG. 4. As shown in FIG. 3, the nut 100 allows a male screw member in a right-hand screw configuration to be threaded into the nut 100 and the bolt 1 is inserted into a screw hole 110 while it is tilted at an angle with respect to the nut 100, so that of the ridge 31 formed on the guide portion 116 on the front end side of the shaft portion 15, the complete ridge at the topmost end is in engagement with (in mesh with) the female screw portion 105 on the inner peripheral face of the nut 100. With this condition, on the peripheral edge of an opening portion 101 of the nut 100 of a side in which the bolt 1 is inserted, the ridge 30 at the front end of the constant diameter portion 115 of the bolt 1 tries to engage with the female screw portion 105 in the nut 100 with a deviation of the pitch. It should be noted that, in the figure, a condition in which the female screw portion 105 of the nut 100 overlaps the ridge 30 at the front end of the constant diameter portion 115 of the bolt 1 means that the ridge 30 positions in front of the female screw portion 105 indicated by its section.

When the bolt 1 is turned (clockwise) in order to engage with the nut 100, the guide portion 116 moves in a direction of escaping from the screw hole 110 of the nut 100 with the clockwise rotation of the bolt 1 because only the ridge 31 on the guide portion 116 is in engagement with the female screw portion 105 of the nut 100, and as long as the ridge 31 on the guide portion 116 is in engagement with the female screw portion 105, even if it is slight, the bolt 1 moves in the direction of escaping completely from the screw hole 110 in the nut 100 (upward direction in the Figure). Although the ridge 30 formed at the front end of the constant diameter portion 115, as well as the ridge 31 on the guide portion 116, is interfering with the female screw portion 105, the height of the ridge 30 at the front end of the constant diameter portion 115 is smaller than the height of the ridge 30 at other portions of the constant diameter portion 115 and it does not engage with the female screw portion 105 deeply. Thus, the ridge 30 at the front end of the constant diameter portion 115 never engages with the female screw portion 105 while the bolt 1 moves in the direction of escaping and the bolt 1 succeeds in escaping from the screw hole 110 smoothly. Further, when the non-threaded portion 126 interferes with the female screw portion 105 of the nut 100 when the bolt 1 is located above the condition shown in the Figure while its tilting angle is greater, the bolt 1 never engages with the nut 100 at other portions than where the ridge 31 of the guide portion 116 is in engagement with the female screw portion 105, whereby the bolt 1 escapes from the screw hole 110 smoothly.

Figure 4:
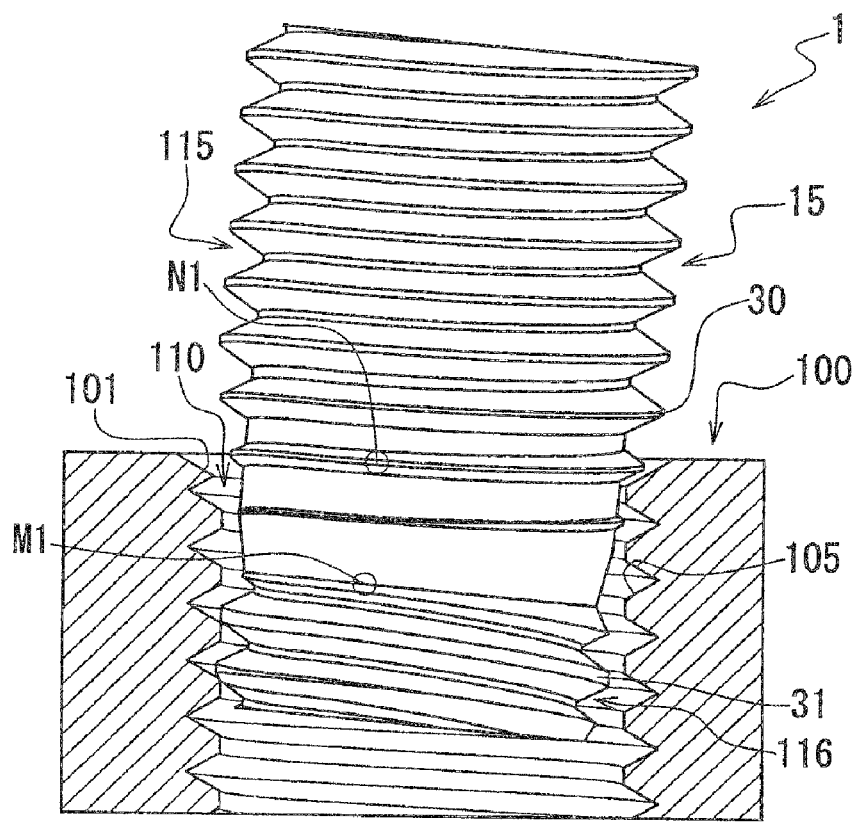
FIG. 4 is a sectional view of a part showing a condition in which the bolt is turned by 60° in the rightward direction from the condition of FIG. 3.
Figure 5:
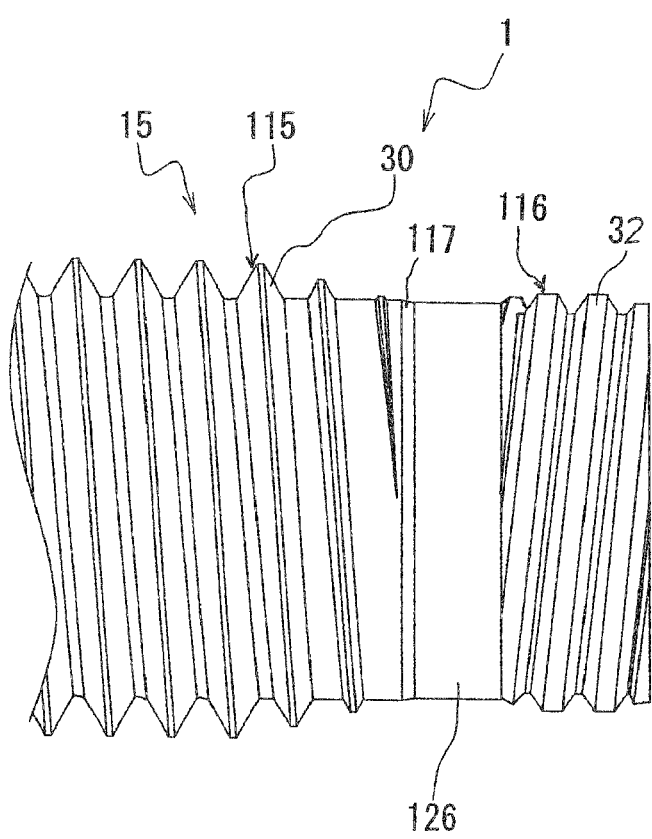
FIG. 5 is a side view of a bolt according to a second embodiment.

FIG. 4 shows a condition when in which, subsequent to the condition of FIG. 3, the ridge 31 of the guide portion 116 in engagement with the female screw portion 105, the bolt 1 is turned by 60° in a tightening direction (rightward direction). As shown in FIG. 4, it can be confirmed that a point M1 on the ridge 31 of the guide portion 116 and a point N1 on the ridge 30 at the front end of the constant diameter portion 115 moves respectively by 60° so that the bolt moves in the direction of escaping, and the ridge 31 on the guide portion 116 engages with the female screw portion 105 so that the bolt 1 moves in the escaping direction with its rotation. In FIG. 3, the ridge 30 at the front end of the constant diameter portion 115 overlapping with the female screw portion 105 of the nut 100 has moved up to the vicinity of the opening portion 101 of the nut 100 after the bolt 1 is rotated by 60° and consequently, the ridge 30 is not in engagement with the female screw portion 105 of the nut 100 the bolt 1 and the nut 100 being prevented from biting or seizing.

Although not shown in detail, when a worker who drives the bolt 1 restores the bolt 1 to a vertically standing posture from the tilted condition, the bolt 1 is fit into an appropriate posture into the screw hole 110 of the nut 100 due to its own weight, the bolt 1 comes that the bolt 1 is tightened normally. It should be noted that the outside diameter of the ridge 31 needs to be formed smaller than the inside diameter of the female screw portion 105 in order to prevent an interference between the guide portion 116 of the bolt shaft portion 15 and the female screw portion 105 of the nut 100 when the bolt 1 turns into an appropriate screwing posture. When the ridge 31 formed on the guide portion 116 of the shaft portion 15 is not fit into (in engagement with) the female screw portion 105 in the inner peripheral face of the nut 100, for example, if the ridge 31 formed on the guide portion 116 is just interfering with the female screw portion 105 in the inner peripheral face of the nut 100, the bolt 1 becomes fit into the screw hole 110 in the nut 100 by its own weight in an appropriate posture and after that, the bolt 1 is tightened into the nut 100 as normally.

As described above, in the bolt 1 of this embodiment, the small diameter guide portion 116 is formed at the distal end of the shaft portion 15 and the ridge 31 in an inverted direction screw configuration to the ridge 30 formed on the constant diameter portion 115 is formed on that guide portion 116. Consequently, in the case that the bolt 1 is inserted into the screw hole 110 tilted with respect to the nut 100, when the ridge 31 on the guide portion 116 becomes into engagement with the female screw portion 105 of the nut 100, the bolt 1 moves in a direction of escaping from the nut 100 because the bolt 1 is not in an appropriate tightening posture. Thus, the bolt 1 cannot be driven into the nut unless it is in an appropriate tightening posture with respect to the nut 100 and consequently, the bolt is never fit into the nut in an inappropriate condition, for example, in a tilted condition, thereby preventing the bolt from biting into and seizing to the nut.

Although the ridge 31 having the inverted direction screw configuration of the guide portion 116 of the bolt 1 described above is of a single threaded screw, a ridge 32 of the double threaded screw having an inverted direction screw configuration are formed on the guide portion 116. Because the other configurations are the same, like reference numerals are attached to the corresponding portions and descriptions thereof are omitted.

Figure 6:
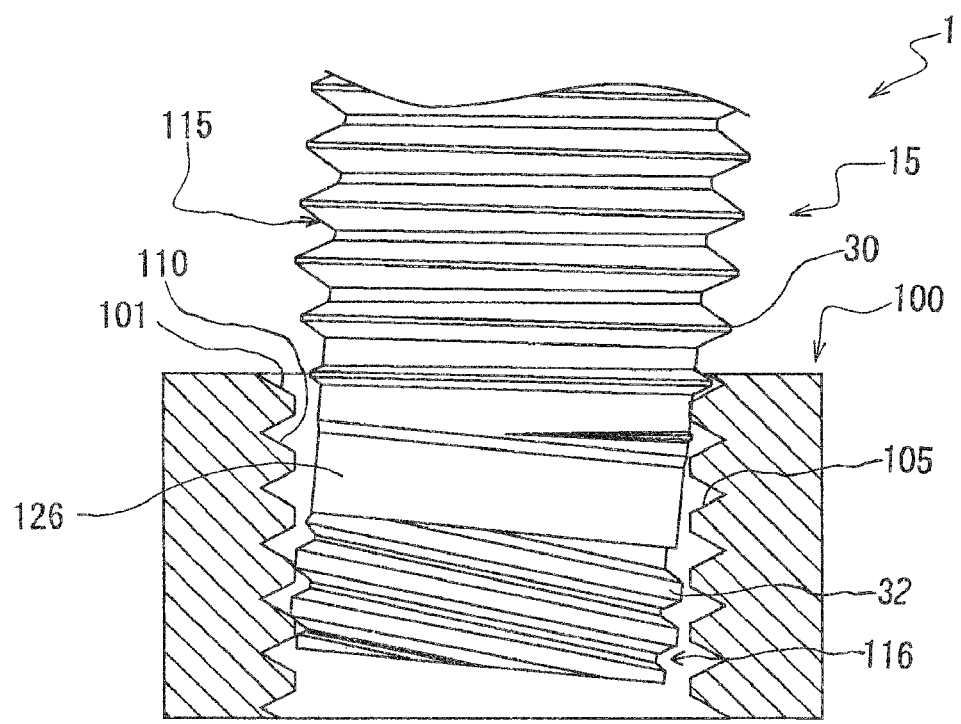
FIG. 6 is a sectional view of a part showing a condition in which the bolt of FIG. 5 is inserted into the screw hole of a nut in a tilted condition.

When the bolt 1 of the second embodiment is inserted into the nut 100 in a tilted condition with respect to the nut 100, as shown in FIG. 6, the ridge 32 of the double thread screw having the inverted direction screw configuration on the guide portion 116 gets into engagement with the female screw portion 105 of the nut 100, thereby floating the bolt 1. However, the amount of travel of the ridge 32 formed on the guide portion 116 corresponds to two pitches per revolution of the bolt 1. Thus, the effects of the escape become twofold as compared with a case where the ridge 31 formed on the guide portion 116 is of a single thread screw. As a result, the bolt 1 cannot be driven into the nut 100 unless the bolt 1 is set into an appropriate tightening posture with respect to the nut 100, thereby securely preventing biting and seizing to the nut 100.

Figure 7:
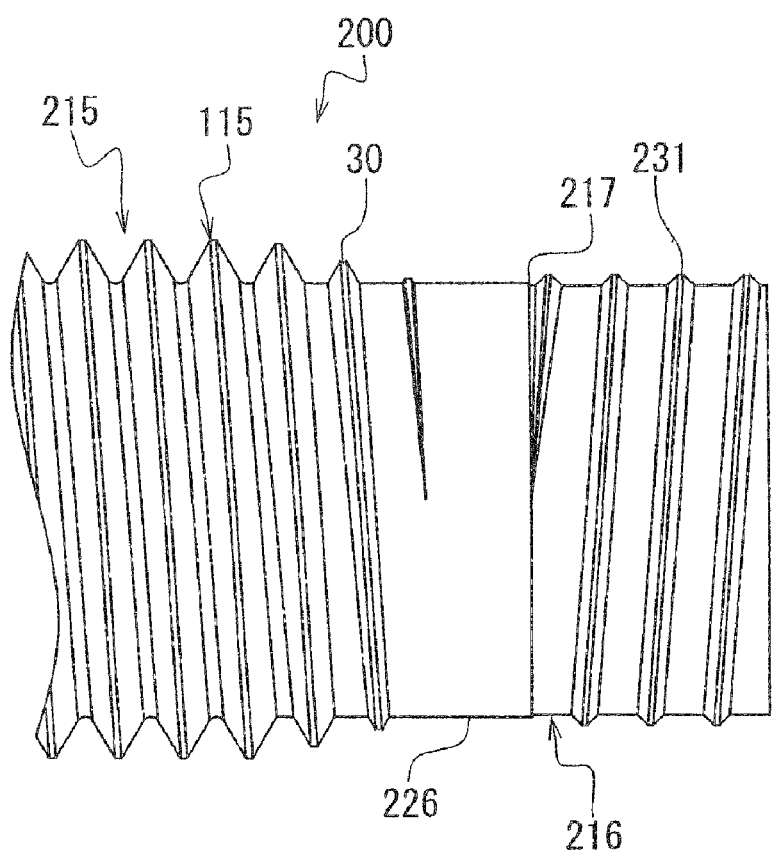
FIG. 7 is an enlarged view of a part showing a front end portion of a shaft portion of a bolt according to a third embodiment.

Next, the second embodiment of the bolt of the present invention will be described with reference to FIG. 7. Here, a bolt 200 is formed into a substantially identical configuration to the bolt 1 of the above-described embodiment except that the guide portion formed at the front end of the shaft portion. Thus, only the shape of the front end of the shaft portion of the bolt 200 is described in detail. FIG. 7 is an enlarged view of a part showing the front end portion of a shaft portion 215 of the bolt 200 and the same reference numeral as the bolt 1 are attached to common components common to the bolt 1 of the above described embodiment. As shown in FIG. 7, the bolt 200 has the constant diameter portion 115 on the proximal end side of the shaft 215 and the right-hand screw ridge 30 is formed on the constant diameter portion 115. The height of the ridge 30 decreases gradually at the front end portion of the constant diameter portion 115 so that the external shape of the screws produced by connecting the crests of the ridge 30 is of a tapered configuration whose diameter decreases gradually with a taper angle of about 15°.

In the bolt 200, a non-threaded portion 226 having no threads extends from the front end of the constant diameter portion 115, different from the bolt 1. This non-threaded portion 226 has a substantially identical diameter to the root diameter of the constant diameter portion 115 and further, a truncated cone shaped tapered portion 217 extends in a very short length from the front end of the non-threaded portion 226. A guide portion 216 having a much smaller diameter than the root diameter of the constant diameter portion 115 extends from the front end of a tapered portion 217. A ridge 231 lower than the ridge 31 formed on the guide portion 116 of the bolt 1 is formed on the guide portion 216 and the ridge 231 is in an inverted direction screw configuration with respect to the ridge 30 on the constant diameter portion 115, that is, of a left-hand screw configuration. While the ridge 31 on the guide portion 116 of the bolt 1 is formed with a ridge angle of about 60°, the ridge 231 is formed with a ridge angle of about 90°.

The bolt 200 of this embodiment can securely prevent occurrence of biting when it is inserted obliquely into the female screw member, such as a nut. Specifically, when the bolt 200 is inserted obliquely into a screw hole of a nut that is not shown, the ridge 216 formed on the guide portion 231 and the female screw portion of the nut interfere with each other. However, the biting with the female screw portion is shallow because the ridge 231 on the guide portion is formed at a lower height. Consequently, the bolt 200 of this embodiment can suppress tilting thereof when it is inserted into the female screw member, such as a nut, and the bolt can be driven into securely with an appropriate tightening posture. It should be noted that the ridge 231 may be of a single threaded screw or a double threaded screw.

As described above, in the bolt of the present invention, the constant diameter portion is formed on the proximal end side of the shaft portion and the guide portion having a smaller diameter is formed on the front end side, and the ridge on this guide portion is formed into an inverted direction screw configuration as compared with the ridge of the constant diameter portion. Consequently, when the bolt is inserted inappropriately into the female screw member, more specifically, in a tilted condition, this bolt is moved outward of the female screw member because it is not set in an appropriate tightening posture. In other words, because the bolt cannot be driven into unless it is set into an appropriate tightening posture with respect to the female screw member, the bolt is not fit into the female screw member in an inappropriate posture, for example, in a tilted condition, biting or seizing of the bolt to the female screw member can be prevented securely. Further, the effects can be intensified by forming the ridge on the guide portion in a double threaded screw configuration. In the case the non-threaded portion having no ridge is formed between the constant diameter portion and the guide portion, when the bolt is inserted into the female screw member in a tilted condition, the non-threaded portion and the female screw portion never engage with each other even if the non-threaded portion interferes with the inner peripheral face of the female screw portion, thereby the bolt can be prevented from biting into the female screw member.

The present invention is not restricted to the above-described embodiments but may be modified in various ways. Although in this embodiment, a nut has been exemplified as a female screw member, it is natural that the bolt of the present invention can be applied to other female screw members. Although in this embodiment, the length of the area in which the height of the ridge decreases gradually on the constant diameter portion of the bolt, the length of the non-threaded portion, the length of the tapered portion and the like have been exemplified, these are mere examples and it is needless to say that the respective portions may be formed into sizes other than mentioned in the above embodiments. Additionally, the shape of the ridge formed on the guide portion and the shape of the ridge formed on the constant diameter portion are not limited to those of this embodiment but may be modified appropriately.

The invention claimed is:

1. A bolt having a head portion and a shaft portion extending therefrom on which a helical thread is formed, the bolt being adapted to be tightened into a single direction receiving female screw member such as a nut, wherein the shaft portion is comprised of a constant diameter thread portion having a constant diameter formed on the proximal end side that extends over a predetermined length and subsequently the diameter is decreased from the distal end of the constant diameter towards the front, so the external screw thread shape thus formed is tapered at an angle down to a reduced forward diameter, and a guide thread portion is formed on a front end side thereof and having a smaller diameter than the constant diameter thread portion, wherein a thread formed on the guide thread portion is formed in an inverted screw direction with respect to the helical thread formed on the constant diameter thread portion, and wherein the thread formed on the guide thread portion is formed into a double threaded screw configuration in the inverted screw direction.

2. The bolt according to claim 1 wherein a non-threaded portion having no screw thread is formed in a predetermined range between the constant diameter thread portion and the guide thread portion of the shaft portion.

* * * * *